(12) United States Patent
Nakanishi et al.

(10) Patent No.: US 7,053,588 B2
(45) Date of Patent: May 30, 2006

(54) POWER SUPPLY CONTROLLER, ELECTRIC VEHICLE AND BATTERY CONTROL UNIT

(75) Inventors: Toshiaki Nakanishi, Toyohashi (JP); Keiichi Minamiura, Utsunomiya (JP)

(73) Assignee: Panasonic EV Energy Co., Ltd., Kosai (JP)

( * ) Notice: Subject to any disclaimer, the term of this patent is extended or adjusted under 35 U.S.C. 154(b) by 0 days.

(21) Appl. No.: 11/266,073

(22) Filed: Nov. 3, 2005

(65) Prior Publication Data

US 2006/0091857 A1 May 4, 2006

(30) Foreign Application Priority Data

Nov. 4, 2004 (JP) ............................. 2004-321138

(51) Int. Cl.
*H02J 7/00* (2006.01)
(52) U.S. Cl. ...................................... 320/104
(58) Field of Classification Search ................ 320/104, 320/106, 112, 152; 702/63
See application file for complete search history.

(56) References Cited

U.S. PATENT DOCUMENTS

| | | | | |
|---|---|---|---|---|
| 5,315,228 A | * | 5/1994 | Hess et al. ................ | 320/106 |
| 5,703,466 A | * | 12/1997 | Honda et al. ............. | 320/152 |
| 5,789,899 A | * | 8/1998 | van Phuoc et al. ........ | 320/112 |
| 6,025,695 A | * | 2/2000 | Friel et al. ................ | 320/106 |
| 6,075,346 A | | 6/2000 | Kikuchi et al. ............ | 320/150 |
| 6,317,697 B1 | * | 11/2001 | Yoshikawa et al. ......... | 702/63 |
| 6,362,627 B1 | | 3/2002 | Shimamoto et al. ........ | 324/434 |

FOREIGN PATENT DOCUMENTS

| JP | 10-94101 | | 4/1998 |
|---|---|---|---|
| JP | 11211802 | * | 8/1999 |
| JP | 11-248757 | | 9/1999 |
| JP | 2000268588 | * | 9/2000 |
| JP | 3360499 | | 10/2002 |
| JP | 2003-219510 | | 7/2003 |

* cited by examiner

Primary Examiner—Pia Tibbits
(74) Attorney, Agent, or Firm—Hamre, Schumann, Mueller & Larson, P.C.

(57) ABSTRACT

A voltage measurement part 200 measures voltage Vn for each of the blocks of a battery pack 7, electric current In is measured with the same timing by a current measuring circuit 201, and a counter 206 counts the number of times an effective load power Pn obtained from a product of the electric current and voltage of each block by an electric power computation part 203 exceeds permissible electric power values Pcn and Pdn calculated by a permissible electric power computation part 205, such that when the count value is equal to or higher than a preset value, a decision part 207 outputs a contactor opening request signal Copen so as to bring the contactors into an open state and protect the battery pack.

9 Claims, 7 Drawing Sheets

POWER SUPPLY CONTROLLER, ELECTRIC VEHICLE AND BATTERY CONTROL UNIT

BACKGROUND OF THE INVENTION

1. Field of the Invention

The present invention relates to a power supply controller controlling the status of connection between a load and a battery pack formed by combining a plurality of secondary batteries, and, in particular, to a technology for controlling the status of connection between a battery pack and an inverter in an electric vehicle traveling by converting DC power from a battery pack, i.e. a driving power source installed on electric vehicles such as, in particular, pure electric vehicles (PEV), hybrid electric vehicles (HEV), and hybrid electric vehicles with fuel cells and secondary batteries, etc., to AC power using the inverter and supplying it to a motor.

2. Description of Related Art

Overdischarging and overcharging has to be avoided when using secondary batteries, such as nickel hydrogen secondary batteries, lithium secondary batteries, etc. If a secondary battery is seriously overdischarged or overcharged, the electrolysis of the electrolyte inside the battery generates gas, which reduces the useful life of the secondary battery and degrades the secondary battery.

On the other hand, the method used for battery control in pure electric vehicles (PEV), where propulsive power is generated by a motor based on energy from a battery pack formed by combining a plurality of secondary batteries, as well as in the so-called hybrid electric vehicles (HEV), in which both an engine and a motor are installed, consists not only in using power running control (discharge control) for obtaining propulsive power, but also in using regenerative control (charge control) for recovering braking energy to the motor the vehicle uses for travel.

For example, Japanese Patent No. 3360499 describes a regenerative brake control device installed in an electric vehicle including a motor. The regenerative brake control device includes means for determining a charging power upper limit value based on the secondary battery condition, means for controlling the upper limit of a control target for regenerative braking force based on the charging power upper limit value and the rotational speed of the motor, and means for reducing the control target for regenerative braking force when the voltage of the battery exceeds a predetermined permissible value.

In addition, JP 2003-219510A describes a charge/discharge control device including charge/discharge power limiting means for controlling charge/discharge power so as to avoid exceeding a charge/discharge power upper limit value, which changes depending on the temperature and amount of charge stored in the secondary batteries.

Furthermore, JP H10-94101A describes an electric vehicle including emergency forced shutoff means for automatically performing a forced shutoff of an electric storage device supplying electric power to a motor when the vehicle encounters a predetermined emergency.

Based on the above, it is believed that it is essential to carry out control so as to maintain a permissible charge/discharge power value, and a permissible charge/discharge voltage value for a battery in accordance with the condition of the secondary battery, i.e. its voltage, temperature, and stored charge. In addition, it is believed that it is essential to shut off electric power to the motor to ensure the safety of the vehicle and, at the same time, in some cases, urge the user to repair it under circumstances causing overcharging, overdischarging, malfunctioning of the electric power control devices of the vehicle or severe battery life degradation.

Incidentally, due to the significant electric power requirements of secondary batteries used for driving electric vehicles, it is common to use battery packs made up of a plurality of serially connected single cells. As described in JP H11-248757A, using a flying capacitor circuit for a plurality of voltage sources allows for voltage measurement while maintaining insulation between the measurement system and the voltage sources with the help of a simple circuit.

In addition, according to the conventional technology, the electric power or voltage of a battery pack are monitored and, when any of those exceed a permissible charging power value or a permissible upper limit voltage value, or when they drop below a permissible discharging power value or a permissible lower limit voltage value, the connection between the battery pack and the motor is shut off.

However, in the above-described conventional technology, the battery pack was divided into blocks and the voltage of the battery pack was calculated by adding up voltages measured by a voltage sensor for each block. In addition, the determination of whether or not, for instance, the electric power of a battery pack exceeded a permissible charging power value was carried out based on an integrated value by computing the product of the electric current measured by a current sensor and the battery pack voltage obtained by such summation. Consequently, the problem with the above-described conventional technology was that computation and decision-making required time and detection was impossible when electric power exceeded a permissible charging power value within a short time period in a pulsed fashion. This resulted in a reduction in the useful life of the secondary batteries and caused their degradation.

SUMMARY OF THE INVENTION

The present invention was made with account taken of the above-described problems, and it is an object of the invention to provide a power supply controller that can prevent the degradation and reduction in useful life and maximize the performance of secondary batteries by reliably protecting the secondary batteries, to provide an electric vehicle whose safety is ensured by installing such a power supply controller, and, furthermore, to provide a battery control unit for controlling the condition of the battery pack.

In order to attain the above-mentioned object, the power supply controller of the present invention, which is a power supply controller controlling the status of connection between a battery pack formed by combining a plurality of (for instance, 144) single cells or unit cells that are secondary batteries, and a load attached to the battery pack, includes: contact switching devices provided between the battery pack and the load (a positive side main contactor and a negative side main contactor), a voltage measurement part for measuring voltage block-by-block ($V_n$, $n=1\sim12$) on a time series basis, with each block containing a predetermined number (for instance, 12) of single cells or unit cells from the battery pack, a current measuring circuit for measuring electric current ($I_n$) flowing in the battery pack with the same timing as that used by the voltage measurement part to measure the voltage of each block, an electric power computation part for calculating the electric power ($P_n$) of each block by computing the product of the voltage of each block obtained from the voltage measurement part and electric current obtained from the current measuring circuit, a counter that counts the number of times the electric power of each block calculated by the electric power computation part exceeds permissible electric power values (permissible charging power value Pcn, permissible discharge power value Pdn), and a control circuit (contactor control circuit) controlling the contact switching devices to an open state at the point when the count value of the counter is equal to or higher than a preset value.

Based on the above-described features, quick decisions can be made at the voltage acquisition timing for each of the blocks as to whether or not the effective load power of the battery pack has exceeded permissible electric power values, thereby enabling early battery pack malfunction diagnostics. As a result, it becomes possible to prevent a reduction in useful life and degradation of the secondary batteries.

In addition, in a preferred embodiment of the power supply controller of the present invention, the voltage measurement part includes a first switch circuit, a second switch circuit, a capacitor, a third switch circuit, and a voltage measuring circuit. The first switch circuit includes a group of first switch elements, one end of which is connected to one end of every other block constituting the battery pack and the other ends are jointly connected to a first potential detection line. The second switch circuit has a group of second switch elements, one end of which is connected to the other end of every other block constituting the battery pack and the other ends are jointly connected to a second potential detection line, and, after putting a second switch element forming part of the group of second switch elements into an ON state with the same timing as a first switch element forming part of the group of first switch elements enters into an ON state and putting said second switch element into an OFF state with the same timing as said first switch element enters into an OFF state, brings the second switch element into an ON state again with the same timing as the timing with which a next first switch element forming part of the group of first switch elements enters into an ON state; the capacitor is provided between the first potential detection line and the second potential detection line. The third switch circuit goes from an OFF state to an ON state and outputs a potential at both ends of the capacitor after the first switch circuit and the second switch circuit go from an ON state to an OFF state. The voltage measuring circuit measures voltage for each block based on the potential outputted from the third switch circuit.

In the above-described embodiment, the voltage measurement part is made up of a flying capacitor circuit and a voltage measuring circuit. In accordance with this configuration, in a hybrid electric vehicle, etc., voltage for each block of a battery pack made up of serially connected a plurality of single cells or unit cells can be measured while maintaining insulation between the blocks and the measurement system with the help of a simple circuit.

In addition, a preferred embodiment of the power supply controller of the present invention further includes a temperature measuring circuit, a state-of-charge computation part, and a permissible electric power computation part. In this case, the temperature measuring circuit measures temperature (Tm) in the vicinity of the blocks subject to the block-by-block voltage measurement by the voltage measurement part. The state-of-charge computation part calculates a state of charge of the battery pack. The permissible electric power computation part calculates a permissible electric power value for each block based on a temperature/voltage-dependent permissible electric power value, which depends on the temperature measured by the temperature measuring circuit and on the voltage measured by the voltage measurement part, a state-of-charge dependent permissible electric power value, which depends on the state-of-charge calculated by the state-of-charge computation part, and a temperature/state-of-charge dependent permissible electric power value, which depends on the temperature measured by the temperature measuring circuit and on the state-of-charge calculated by the state-of-charge computation part. In addition, in this case, the permissible electric power computation part calculates a permissible electric power value for each block as the smallest value among the temperature/voltage-dependent permissible electric power value, the state-of-charge dependent permissible electric power value, and the temperature/state-of-charge dependent permissible electric power value.

In accordance with the above-described embodiment, when the state of charge (SOC: State of charge) of the battery pack decreases, the permissible electric power computation part sets the permissible discharge power value Pdn to a small value in order to induce a higher SOC, and when the SOC is high, sets the permissible charging power value Pcn to a small value in order to induce a lower SOC. In addition, it is possible to obtain optimum permissible electric power values corresponding to the battery condition of each block, which changes with temperature. For instance, since the internal resistance of the battery increases and input/output becomes severely limited in the low temperature region, the permissible electric power computation part sets the permissible charging power value Pcn and the permissible discharge power value Pdn to low values. In addition, when the battery voltage becomes low, the permissible electric power computation part sets the permissible discharge power value Pdn to a low value in order to prevent the battery from overdischarging, and when the battery voltage becomes high, sets the permissible charging power value Pcn to a low value in order to suppress generation of gas inside the batteries.

In order to attain the above-mentioned object, the electric vehicle of the present invention, which is an electric vehicle that moves by converting DC power from a battery pack formed by combining a plurality of (for instance, 144) single cells or unit cells that are secondary batteries to AC power using an inverter and supplying it to a motor, includes at least two contact switching devices (a positive side main contactor and a negative side main contactor) provided between the battery pack and the inverter, a voltage measurement part for measuring voltage block-by-block (Vn, n=1~12) on a time series basis, with each block containing a predetermined number (for instance, 12) of single cells or unit cells from the battery pack, a current measuring circuit for measuring electric current (In) flowing in the battery pack with the same timing as the one used by the voltage measurement part to measure the voltage of each block, an electric power computation part for calculating the electric power (Pn) of each block by computing the product of the voltage of each block obtained from the voltage measurement part and the electric current obtained from the current measuring circuit, a counter that counts the number of times the electric power of each block calculated by the electric power computation part exceeds a permissible electric power value (permissible charging power value Pcn, permissible discharge power value Pdn), and a control circuit (contactor control circuit) for controlling the contact switching devices to an open state at the point when the count value of the counter is equal to or higher than a preset value.

Based on the above-described features, decisions can be made in accordance with the voltage acquisition timing for each of the blocks as to whether the effective load power of the battery pack has exceeded the permissible electric power values, thereby enabling speedy battery pack malfunction diagnostics. As a result, the reliable protection of the secondary batteries makes it possible to prevent the reduction in their useful life and degradation and to ensure the safety of the vehicle.

In addition, in a preferred embodiment of the inventive electric vehicle, the voltage measurement part includes a first switch circuit, a second switch circuit, a capacitor, a third switch circuit, and a voltage measuring circuit. The first switch circuit includes a group of first switch elements, one end of which is connected to one end of every other block constituting the battery pack and the other ends are jointly connected to a first potential detection line. The second switch circuit has a group of second switch elements, one end of which is connected to the other end of every other block constituting the battery pack and the other ends are jointly connected to a second potential detection line and, after putting a second switch element forming part of the group of second switch elements into an ON state with the same timing as a first switch element forming part of the group of first switch elements enters into an ON state and putting said second switch element into an OFF state with the same timing as the first switch element enters into an OFF state, brings the second switch element into an ON state again with the same timing as the timing with which a next first switch element forming part of the group of first switch elements enters into an ON state. The capacitor is provided between the first potential detection line and the second potential detection line. The third switch circuit goes from an OFF state to an ON state and outputs a potential at both ends of the capacitor after the first switch circuit and the second switch circuit go from an ON state to an OFF state. The voltage measuring circuit measures voltage for each block based on the potential outputted from the third switch circuit.

In the above-described embodiment, the voltage measurement part is made up of a flying capacitor circuit and a voltage measuring circuit. In accordance with this configuration, in a hybrid electric vehicle, etc., voltage for each block of a battery pack made up of serially connected a plurality of single cells or unit cells can be measured while preserving insulation between the blocks and the measurement system with the help of a simple circuit.

In addition, a preferred embodiment of the electric vehicle of the present invention further includes a temperature measuring circuit, a state-of-charge computation part, and a permissible electric power computation part. In this case, the temperature measuring circuit measures temperature (Tm) in the vicinity of the blocks subject to the block-by-block voltage measurement by the voltage measurement part. The state-of-charge computation part calculates a state of charge of the battery pack. The permissible electric power computation part calculates a permissible electric power value for each block based on a temperature/voltage-dependent permissible electric power value, which depends on the temperature measured by the temperature measuring circuit and on the voltage measured by the voltage measurement part, a state-of-charge dependent permissible electric power value, which depends on the state-of-charge calculated by the state-of-charge computation part, and a temperature/state-of-charge dependent permissible electric power value, which depends on the temperature measured by the temperature measuring circuit and on the state-of-charge calculated by the state-of-charge computation part. In addition, in such a case, the permissible electric power computation part calculates a permissible electric power value for each block as the smallest value among the temperature/voltage-dependent permissible electric power value, the state-of-charge dependent permissible electric power value, and the temperature/state-of-charge dependent permissible electric power value.

In accordance with the above-described embodiment, when the SOC of the battery pack decreases, the permissible electric power computation part sets the permissible discharge power value Pdn to a small value in order to induce a higher SOC, and when the SOC is high, it sets the permissible charging power value Pcn to a small value in order to induce a lower SOC. In addition, it is possible to obtain optimum permissible electric power values corresponding to the battery condition of each block, which changes with temperature. For instance, since the internal resistance of the battery increases and input/output becomes severely limited in the low temperature region, the permissible electric power computation part sets the permissible charging power value Pcn and permissible discharge power value Pdn to low values. In addition, when the battery voltage becomes low, the permissible electric power computation part sets the permissible discharge power value Pdn to a low value in order to prevent the battery from overdischarging, and when the battery voltage becomes high, sets the permissible charging power value Pcn to a low value in order to suppress generation of gas inside the batteries.

In order to attain the above-mentioned object, the battery control unit of the present invention, which is a battery control unit controlling the condition of a battery pack formed by combining a plurality of (for instance, 144) single cells or unit cells that are secondary batteries, includes: a voltage measurement part for measuring voltage block-by-block (Vn, n=1~12) on a time series basis, with each block containing a predetermined number (for instance, 12) of single cells or unit cells from the battery pack, a current measuring circuit for measuring electric current (In) flowing in the battery pack with the same timing as the one used by the voltage measurement part to measure the voltage of each block, an electric power computation part for calculating the electric power (Pn) of each block by computing the product of the voltage of each block obtained from the voltage measurement part and the electric current obtained from the current measuring circuit, a counter that counts the number of times the electric power of each block calculated by the electric power computation part exceeds a permissible electric power value (permissible charging power value Pcn, permissible discharge power value Pdn), and a decision part that decides whether the count value of the counter has reached a preset value and sends the decision results out.

The present invention achieves exclusive effects by providing a power supply controller that reliably protects secondary batteries and thus can prevent a reduction in their useful life and degradation and can maximize the performance of the secondary batteries, providing an electric vehicle whose safety is ensured by installing such a power supply controller, and, furthermore, providing a battery control unit for controlling the condition of the battery pack.

DETAILED DESCRIPTION OF THE INVENTION

Hereinbelow, a hybrid electric vehicle (HEV), as a preferred embodiment of the present invention, is explained by referring to drawings.

Figure 1:
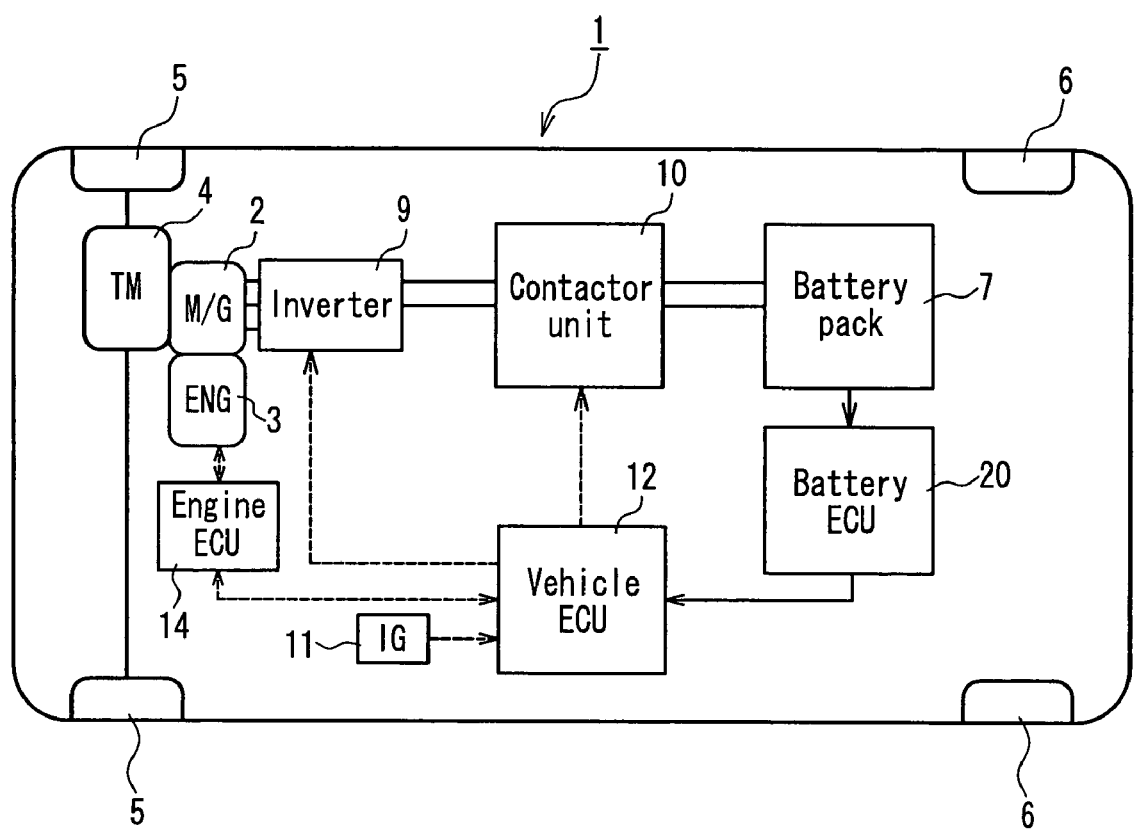
FIG. 1 illustrates an overall configuration of an HEV utilizing the power supply controller of an embodiment of the present invention.

FIG. 1 illustrates an overall configuration of an HEV, an electric vehicle used in this embodiment of the present invention. In FIG. 1, the HEV 1 has a pair of left and right front wheels 5 and 5, which operate as drive wheels, and a pair of left and right rear wheels 6 and 6, which function as driven wheels. The output of a motor generator (M/G) 2 or an engine (ENG) 3 is transmitted via a transmission (TM) 4 to the pair of left and right front wheels 5 and 5 that serve as the drive wheels.

A battery pack 7, which outputs a voltage of e.g. 360V and is installed in the rear portion of the HEV 1, is connected to the motor generator 2 via a contactor unit 10 and an inverter 9. ON/OFF signals from an ignition key switch (IG) 11 are supplied to a vehicle electronic control unit (hereinafter called "vehicle ECU" for short) 12. The vehicle ECU 12 controls the contactor unit 10, the inverter 9 and an engine electronic control unit (hereinafter called "engine ECU" for short) 14. In addition, the engine 3 is controlled by the engine ECU 14. A battery control unit (hereinafter called "battery ECU" for short) 20 receives block-by-block battery voltage, charge/discharge current, battery temperature, and other information from the battery pack 7 and estimates the SOC of the battery pack 7. In addition, the battery control unit 20 sends the permissible charging power value Pcn, permissible discharge power value Pdn, SOC, battery pack voltage, and other information to the vehicle ECU 12.

Figure 2:
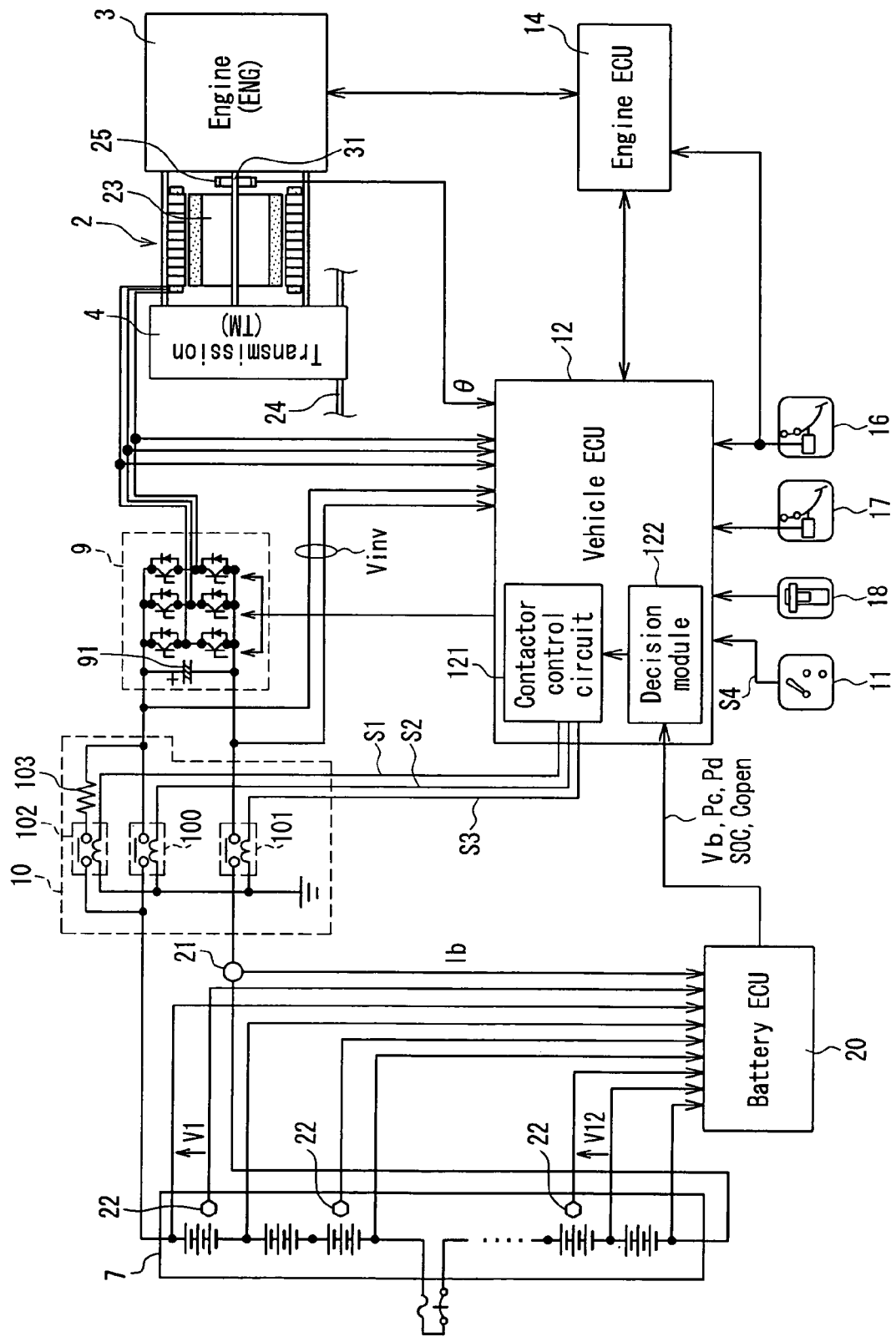
FIG. 2 is a functional block diagram showing a detailed structure of the control system of FIG. 1.

FIG. 2 is a functional block diagram showing a detailed structure of the control system of FIG. 1.

As shown in FIG. 2, the rotor 23 of the motor generator 2 is connected to the output shaft 31 of the engine 3. In addition, the output (drive) of the engine 3 is inputted to the transmission 4 via the output shaft 31. The motor generator 2 operates as a 3-phase AC generator or a 3-phase AC electric motor. The transmission 4 reduces the rotational speed of the output shaft 31 of the engine 3 with its internal gears. The drive is transmitted through a differential gear (not shown) provided in the transmission 4 to a drive shaft 24, which has the drive wheels 5, 5 (FIG. 1) connected to its ends. Based on the configuration above, the output of the engine 3 or motor generator 2 is transmitted to the drive wheels 5, 5 and drives the HEV 1.

The output and rotational speed of the engine 3 are controlled by the engine ECU 14 in accordance with the amount of displacement of the accelerator pedal 16, environmental conditions such as cooling water temperature, intake air temperature, and intake air pressure, etc., as well as engine information provided by a crank sensor and a knock sensor, and, furthermore, the operating status of the motor generator 2.

The battery pack 7, as shown in FIG. 2, is composed of a plurality of single cells or unit cells connected in series. In addition, the battery pack 7 is connected to the inverter 9 via the contactor unit 10. The contactor unit 10 is made up of a positive side main contactor 100 (positive side contact switching device), a negative side main contactor 101 (negative side contact switching device), and a pre-charging circuit. The positive side main contactor 100 is connected between an anode terminal of the battery pack 7 and a high potential input terminal of the inverter 9. The negative side main contactor 101 is connected between a cathode terminal of the battery pack 7 and a low potential input terminal of the inverter 9. The pre-charging circuit is formed by serial connection between a pre-charging contactor 102 and a current-limiting resistor 103. In addition, the pre-charging circuit, which is connected in parallel to the positive side main contactor 100, pre-charges the smoothing capacitor 91 of the inverter 9 during vehicle startup.

The contacts of the positive side main contactor 100, the negative side main contactor 101, and the pre-charging contactor 102 (hereinafter collectively called "contactors") are open if no start voltage (minimum operating voltage) is supplied from the vehicle ECU 12. On the other hand, the contactor contacts are closed if the start voltage is supplied. In the present embodiment, the switching of the contactors is carried out based on a pre-charging contactor start control signal S1, a positive side main contactor start control signal S2, and a negative side main contactor start control signal S3 supplied from a contactor control circuit 121.

The pre-charging of the smoothing capacitor 91 is carried out under the control of the vehicle ECU 12 by closing the contacts of the pre-charging contactor 102 and the negative side main contactor 101. When the voltage difference between the battery pack voltage Vb and the inverter side voltage Vinv falls below a predefined value, the contactor control circuit 121 of the vehicle ECU 12 determines that the pre-charging is over. When pre-charging is over, the contacts of the positive side main contactor 100 are closed and electric power is supplied from the battery pack 7 to the motor generator 2 via the inverter 9.

The motor generator 2 is controlled by the inverter 9, receiving and supplying electric power to and from the battery pack 7 via the inverter 9. The inverter 9 is under the control of the vehicle ECU 12. The inverter 9 is controlled by the vehicle ECU 12 based on various information. The various information includes information on the operating status of the engine 3 supplied from the engine ECU 14, the amount of displacement of the accelerator pedal 16, the amount of displacement of the brake pedal 17, the shift range set by the shift lever 18, information on the battery pack 7 obtained from the battery ECU 20, such as the SOC, malfunctioning, etc., the rotational angle θ of the output shaft 31 of the engine 3 detected by a resolver 25, the U-phase, V-phase, and W-phase electric currents Iu, Iv, Iw of the motor generator 2, etc.

Based on this information, the vehicle ECU 12 outputs signals controlling the transistors constituting the inverter 9. Then, the vehicle ECU 12 determines whether to operate the motor generator 2 as a generator or as an electric motor by controlling the field current of the motor generator 2 in accordance with the rotational speed at such time. When the motor generator 2 is operated as a generator, the battery pack 7 is charged, and when it is operated as an electric motor and consumes electric power, electric power is discharged from the battery pack 7.

For example, when the battery ECU 20 detects a decrease in the SOC of the battery pack 7, the vehicle ECU 12, via the inverter 9, causes the motor generator 2 to generate electric power using a portion of the torque generated by the engine 3. This charges the battery pack 7. On the other hand, when the battery ECU 20 detects an increase in the SOC of the battery pack 7, the vehicle ECU 12 slightly suppresses the output of the engine 3 using the engine ECU 14 and operates the motor generator 2 as an electric motor via the inverter 9. In other words, the vehicle ECU 12 carries out control such that the torque generated by the motor generator 2 is utilized for vehicle travel. In addition, when the vehicle is braked, the vehicle ECU 12 operates the motor generator 2 as a generator and charges the battery pack 7 with the generated electric power.

As it is difficult to predict the braking of the HEV 1, it is desirable for the battery pack 7 to accept sufficient amounts of electric power generated by braking. On the other hand, when the driver cannot obtain the desired acceleration using the output of the engine 3 alone, the battery pack 7 needs to have a certain SOC level in order to operate the motor generator 2 as an electric motor. In order to satisfy this condition, the SOC of the battery pack 7 is constantly controlled to be at a middle level (about 60%) of battery capacity In an HEV, which uses the output of the engine 3 to generate electric power and charge the battery, appropriate management of the SOC of the battery pack 7 provides for increased efficiency by recovering sufficient amounts of regenerative electric power during braking and allows the driver to achieve the desired degree of acceleration during acceleration. Therefore, accurately detecting the SOC of the battery pack 7 and appropriately controlling the SOC is important for vehicles using batteries as a power source, such as HEVs.

The battery pack 7 is divided into a plurality of (for instance 12) blocks, with the voltage signals (Vn, n=1~12) of each block inputted to the battery ECU 20 via a voltage detection line. In addition, a single block is composed of a plurality of (for instance, 12) single cells or unit cells, with the battery pack 7 as a whole composed of e.g. 144 single cells or unit cells. Also, in the present embodiment, the batteries that constitute the battery pack 7 (in the present embodiment, unit cells) are nickel-hydrogen secondary batteries. However, the batteries are not limited to this type, and it is possible to use lithium-ion, nickel-cadmium, and lead batteries, etc.

Temperature sensors 22 used for detecting temperature are provided in several locations (for example, four locations) in the vicinity of the battery pack 7, with the battery temperature (Tm, m=1~4) detected with these sensors. The temperature sensors 22 are provided in a plurality of locations because the battery pack 7 is rather large and temperature differences inevitably arise between different blocks. Temperature differences between different blocks are due, in particular, to the positioning of the cooling unit (not shown) and the flow rate of the coolant. Therefore, the arrangement of the a plurality of temperature sensors 22 is carried out by placing one temperature sensor 22 in one group of blocks, with a single group of blocks made up of blocks with relatively similar temperatures. In addition, a single group is sometimes made up of a single block. In addition, division into groups is carried out by measuring the temperature of various blocks via experiments etc. conducted in advance. This allows for elimination of the influence of battery voltage differences due to differences in temperature. Thermistors are used as the temperature sensors 22, with temperature-dependent resistance values converted to voltage values and inputted to the battery ECU 20.

In addition, a current sensor 21 is provided for detecting the charge/discharge current of the battery pack 7. The current sensor 21 uses a Hall element to detect the electromagnetic field generated by the electric current flowing through the electric wires during the charging or discharging of the battery pack 7 and converts it to a voltage signal. In addition, the current sensor 21 outputs the voltage signal as a charge/discharge current signal (I) to the battery ECU 20.

Information on the condition of the batteries that constitute the battery pack 7, such as the voltage (Vn) for each block, charge/discharge current I, and battery temperature Tm, is inputted to the battery ECU 20. Based on this information, the battery ECU 20 computes an estimate of the malfunctioning and SOC of the battery pack 7.

Figure 3:
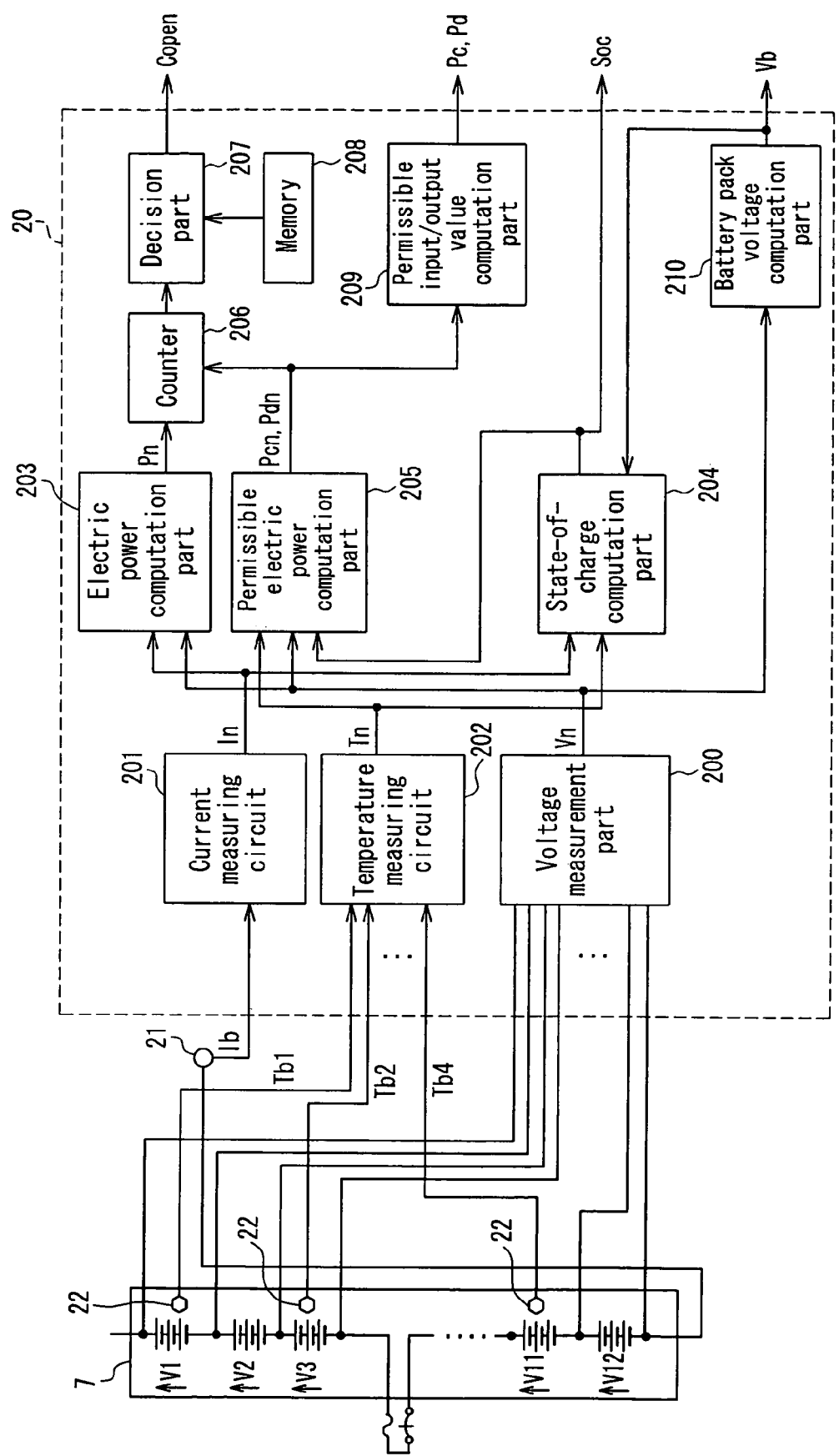
FIG. 3 is a block diagram showing an internal structure of the battery ECU of FIG. 2.
Figure 4:
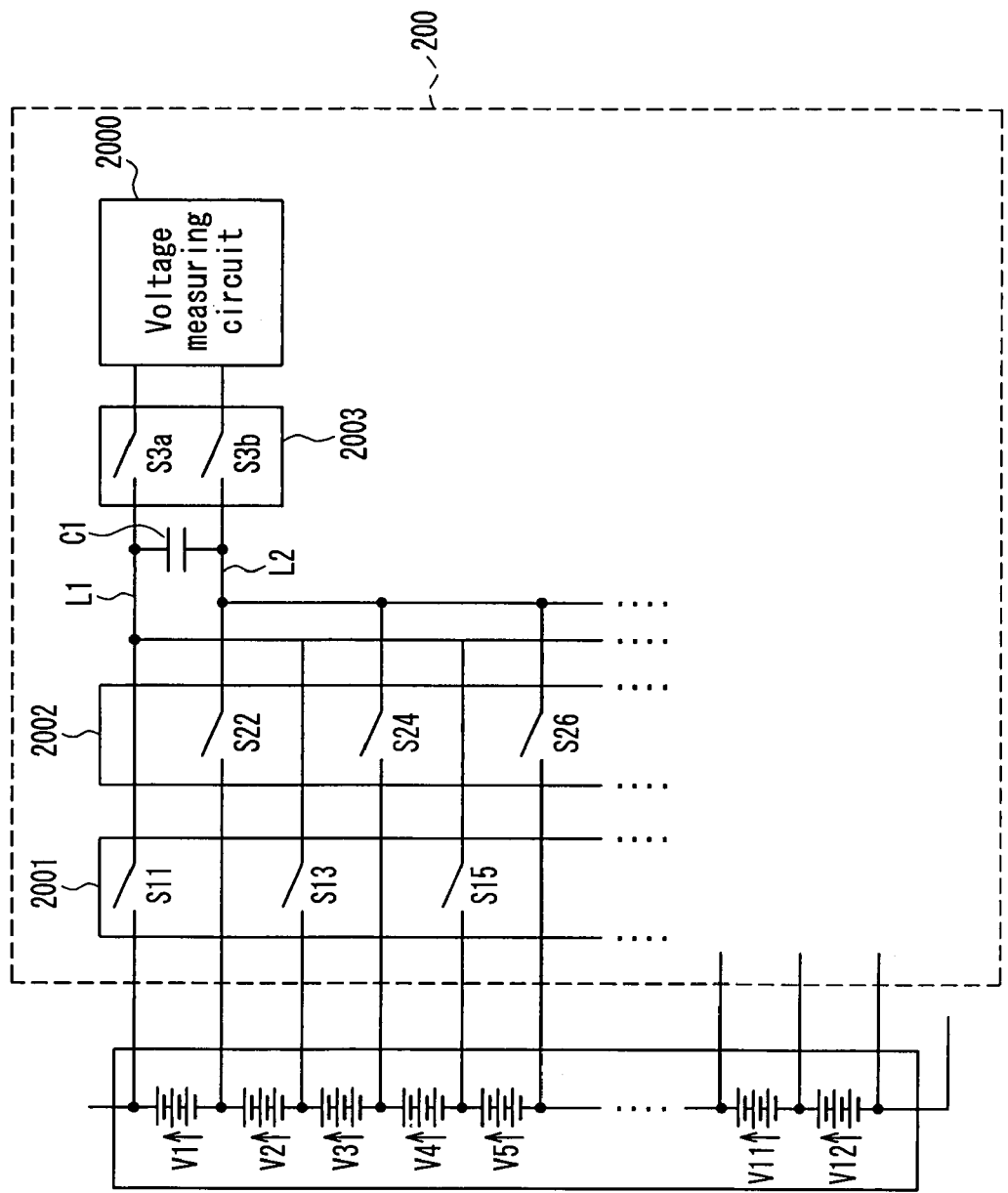
FIG. 4 is a block diagram showing an internal structure of the voltage measurement part of FIG. 3.

FIG. 3 is a block diagram showing an internal structure of the battery ECU 20. In FIG. 3, the voltages Vn of each block are measured by a voltage measurement part 200 on a time series basis. FIG. 4 is a circuit diagram showing an internal structure of the voltage measurement part 200. In FIG. 4, the voltage measurement part 200 is made up of a voltage measuring circuit 2000 and a flying capacitor circuit composed of a first switch circuit 2001, a second switch circuit 2002, a third switch circuit 2003, and a capacitor C1.

The first switch circuit 2001 includes first switch elements S11, S13, S15, . . . , one end of which is connected to one end of every other block constituting the battery pack, and the other ends are jointly connected to a first potential detection line, with the elements forming a first switch group. The second switch circuit 2002 includes second switch elements S22, S24, S26, . . . , one end of which is connected to the other end of every other block constituting the battery pack, and the other ends are jointly connected to a second potential detection line, with the elements forming a second switch group.

Figure 5:
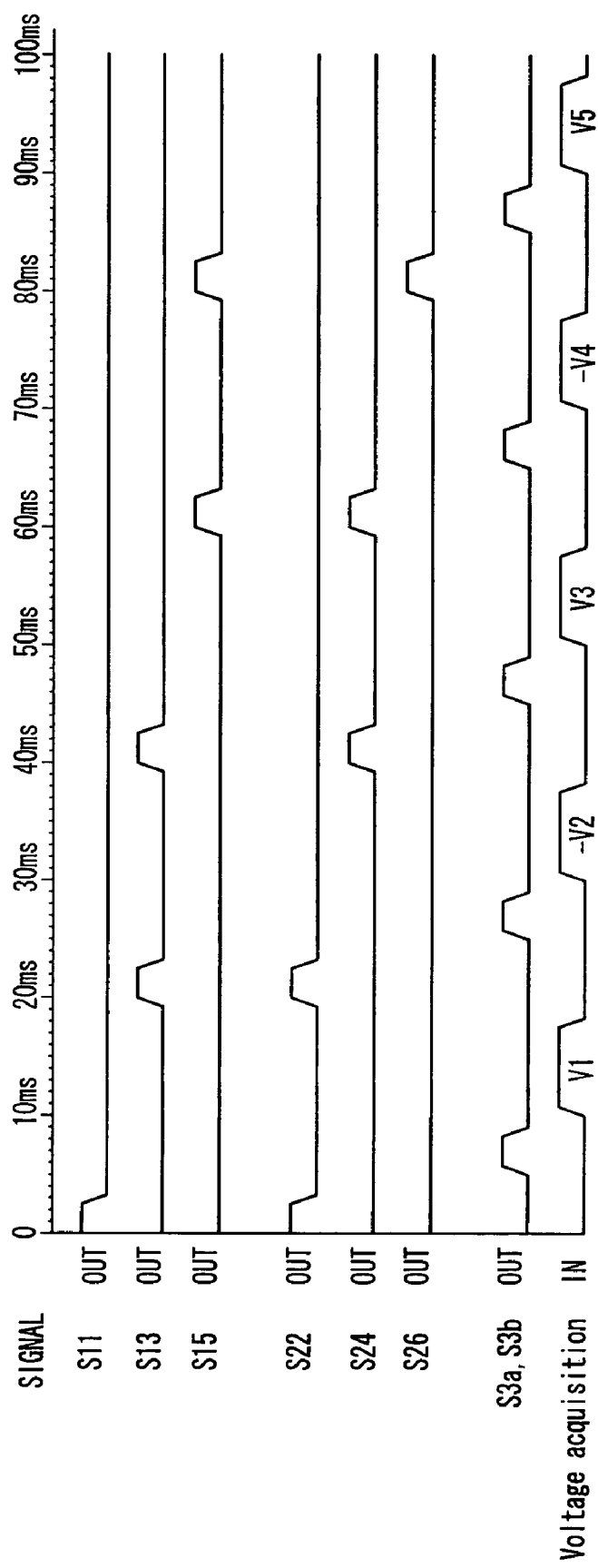
FIG. 5 is a timing chart obtained as a result of block-by-block voltage measurement in FIG. 3.

Next, the operation of the voltage measurement part 200 is explained by referring to FIG. 5.

First of all, the switch element S11 of the first switch circuit 2001 and the switch element S22 of the second switch circuit 2002 are turned on in order to measure the voltage V1 of the first block. One end of the first block is connected to one end of the capacitor C1 via a first potential detection line L1 and the switch element S11, which has been turned on. In addition, the other end of the first block is connected to the other end of the capacitor C1 via a second potential detection line L2 and the switch element S22, which has been turned on. As a result, the voltage V1 of the first block is the same as the potential at the terminals of the capacitor C1.

Next, the switch elements S11 and S22 are turned off, and the switch elements S3a and S3b of the third switch circuit 2003 are turned on. As a result, the potential at the terminals of the capacitor C1 is inputted to the voltage measuring circuit 2000. The voltage measuring circuit 2000 measures the voltage V1 of the selected first block.

Next, to measure the voltage V2 of the second block, the switch element S13, which is located after the switch element S11 of the first switch circuit 2001, is turned on and, furthermore, the switch element S22 of the second switch circuit 2002 is turned on again. One end of the second block (the other end of the first block) is connected to the other end of the capacitor C1 via the second potential detection line L2 and the switch element 22, which has been turned on. In addition, the other end of the second block is connected to one end of the capacitor C1 via the first potential detection line L1 and the switch element S13, which has been turned on. As a result, the voltage V2 of the second block is the same as the potential at the terminals of the capacitor C1 with the polarity reversed.

Next, the switch elements S13 and S22 are turned off, and the switch elements S3a and S3b of the third switch circuit 2003 are turned on. As a result, the potential at the terminals of the capacitor C1 is inputted to the voltage measuring circuit 2000. The voltage measuring circuit 2000 reverses the polarity of the inputted signal, measuring the voltage V2 of the selected second block.

In this manner, in the present embodiment, voltage Vn is measured for each block under the flying capacitor system. The advantage of this system is that it allows for measurements to be conducted while maintaining insulation between the blocks and the measurement system with the help of a simple circuit. In addition, the capacitor C1 may be a type of capacitive means used for storing battery voltage.

Now, going back to FIG. 3 again, explanations will be provided regarding the current measuring circuit 201 and temperature measuring circuit 202. The current measuring circuit 201 measures the charge/discharge current signal I supplied from the current sensor 21 as In (n=1~12) with the same timing as the timing at which the voltage measurement part 200 measures the voltages Vn of each block. The temperature measuring circuit 202 measures the temperature Tm (m=1~4) using the temperature sensors 22 located in the vicinity of the blocks subject to the block-by-block voltage measurement by the voltage measurement part 200.

The voltages Vn of each block supplied by the voltage measurement part 200 and the electric current In supplied by the current measuring circuit 201 are inputted to the electric power computation part 203. Using the timing shown in FIG. 6, the electric power computation part 203 computes the product of the voltage of each block and the electric current, thereby calculating the electric power (Pn) of each block on a time series basis.

In addition, the battery pack voltage Vb supplied from a battery pack voltage computation part 210, which will be described later, the electric current In supplied from the current measuring circuit 201, and the temperature Tm supplied from the temperature measurement unit 202 are inputted to a state-of-charge computation part 204. The state-of-charge computation part 204 calculates the state-of-charge (SOC) of the battery pack 7.

In addition, the voltage Vn of each block supplied from the voltage measurement part 200 and the temperature Tm supplied from the temperature measurement circuit 202 are inputted to a permissible electric power computation part 205. Furthermore, the state-of-charge (SOC), which is supplied from the state-of-charge computation part 204, also is inputted to the permissible electric power computation part 205. Based on this information, the permissible electric power computation part 205 calculates a permissible charging power value Pcn and a permissible discharge power value Pdn for each block. Here, as an example, explanations are provided regarding the method of calculation of the permissible charging power value Pcn.

First of all, the permissible electric power computation part 205 determines whether or not the state-of-charge (SOC) supplied from the state-of-charge computation part 204 is greater than, e.g. 85%, and if it is greater than that, sets a state-of-charge dependent permissible charging power value Pcn_SOC to, for example, 0 kW. If it is determined that the SOC is smaller than 85%, the permissible electric power computation part 205 sets the state-of-charge dependent charging power value Pcn_SOC to, for example, 10 kW.

Next, the permissible electric power computation part 205 determines which of the temperature sensors 22 should be used to obtain the temperature Tm in the vicinity of the blocks subject to voltage measurement. For instance, when there are four temperature sensors 22, it determines whether the block subject to voltage measurement is located before the second block (first block), and, if it is before the second block, acquires temperature T1 from the first temperature sensor. If it determines that the block in question is the second block or a subsequent block, the permissible electric power computation part 205 determines whether or not the block subject to voltage measurement is located before the sixth block (second to fifth block), and, if it is before the sixth block, acquires temperature T2 from the second temperature sensor. Furthermore, if it determines that the block in question is the sixth block or a subsequent block, the permissible electric power computation part 205 determines whether the block subject to voltage measurement is located before the tenth block (sixth to ninth block) and, if it is before the tenth block, acquires temperature T3 from the third sensor. If it determines that the block in question is the tenth block or a subsequent block, the permissible electric power computation part 205 acquires temperature T4 from the fourth temperature sensor.

Next, the permissible electric power computation part 205 uses a reference table, in which data is stored in advance, in order to obtain a temperature/voltage-dependent permissible charging power value Pcn_TV based on the temperature Tm supplied from the temperature measuring circuit 202 and voltage Vn supplied from the voltage measurement part 200.

In addition, the permissible electric power computation part 205 uses a reference table, in which data is stored in advance, in order to obtain a temperature/state-of-charge (SOC)-dependent permissible charging power value Pcn_T-SOC based on the temperature Tm supplied from the temperature measuring circuit 202 and the state-of-charge (SOC) supplied from the state-of-charge computation part 204.

The permissible electric power computation part 205 outputs the smallest value among the thus obtained state-of-charge dependent permissible charging power value Pcn_SOC, the temperature/voltage-dependent permissible charging power value Pcn_TV, and the temperature/state-of-charge (SOC)-dependent permissible charging power value Pcn-TSOC as the permissible charging power value Pcn.

The effective load power Pn for each block calculated by the electric power computation part 203 and the permissible electric power values (permissible charging power value Pcn and permissible discharge power value Pdn) for each of the blocks calculated by the permissible electric power computation part 205 are inputted to a counter 206. The counter 206 counts the number of times the effective load power Pn of each block exceeded the permissible electric power values (permissible charging power value Pcn and permissible discharge power value Pdn).

A count value from the counter 206 is inputted to a decision part 207. If the count value has reached a preset value stored in memory 208, the decision part 207 sends a contactor opening request signal Copen to the vehicle ECU 12 (FIG. 2).

Here, going back to FIG. 2 again, explanations will be provided regarding a decision part 122 included in the vehicle ECU 12. When the decision part 122 in the vehicle ECU 12 receives the contactor opening request signal Copen from the battery ECU 20, it cuts off the battery pack 7 from the inverter 9 by opening all the contactors. Specifically, after engine power and rotational speed, transmission and other vehicle power train conditions have been established such that there are no significant changes in the behavior of the vehicle, the decision part 122 outputs a pre-charging contactor start control signal S1, a positive side main contactor start control signal S2, and a negative side main contactor start control signal S3 through the contactor control circuit 121.

In addition, in the present embodiment, the contactor control circuit 121, the decision part 122 of the vehicle ECU 12, the battery ECU 20, and the contact switching device, i.e. the contactor unit 10, constitute a power supply controller.

Now, more explanations will be provided regarding FIG. 3. As shown in FIG. 3, the permissible electric power values (permissible charging power value Pcn, permissible discharge power value Pdn) for each block calculated by the permissible electric power computation part 205 also are inputted to a permissible input/output value computation part 209. The permissible input/output value computation part 209 adds up the permissible charging power values of all the blocks supplied from the permissible electric power computation part 205 and calculates a permissible input value Pc that can be charged to the battery pack 7. In addition, the permissible input/output value computation part 209 adds up the permissible discharge power values for all the blocks and calculates a permissible output value Pd that can be discharged from the battery pack 7. Furthermore, the permissible input/output value computation part 209 sends the calculated permissible input value Pc and permissible output value Pd to the vehicle ECU 12 (FIG. 2).

In addition, the battery pack voltage computation part 210 adds up the voltages Vn of all the blocks supplied from the voltage measurement part 200 and calculates a battery pack voltage Vb for the battery pack 7 as a whole. The battery pack voltage computation part 210 sends the calculated battery pack voltage Vb to the vehicle ECU 12 (FIG. 2).

For example, when the SOC of the battery pack 7 decreases, the battery ECU 20 induces an increase in the SOC by setting the permissible output value Pd to a low value. On the other hand, when the SOC is high, the battery ECU 20 induces a decrease in the SOC by setting the permissible input value Pc to a low value.

In addition, the battery ECU 20 outputs the SOC value obtained from the state-of-charge computation part 204 to the vehicle ECU 12. In such a case, the vehicle ECU 12 carries out control such that charge/discharge balance is achieved with this value being preferably in the middle range of the SOC, for instance, in the vicinity of SOC=60%. In addition, since the internal resistance of the battery increases and input/output becomes severely limited in the low temperature region, the permissible input/output value computation part 209 sets both the permissible input value Pc and the permissible output value Pd to values smaller than the calculated values.

In addition, when the battery pack voltage Vb decreases, the permissible input/output value computation part 209 sets the permissible output value Pd to a value smaller than the calculated value so as to prevent the battery from overdischarging. On the other hand, when the battery pack voltage Vb becomes high, the permissible input/output value computation part 209 sets the permissible input value Pc to a value smaller than the calculated value so as to suppress gas generation inside the batteries. Furthermore, if the internal resistance of the battery pack 7 increases when there is a problem with the battery pack 7, or if the internal resistance of the battery pack 7 increases when it reaches the end of its useful life, the permissible input/output value computation part 209 limits the values of the permissible input value Pc and permissible output value Pd so as to eliminate such situations.

Figure 7:
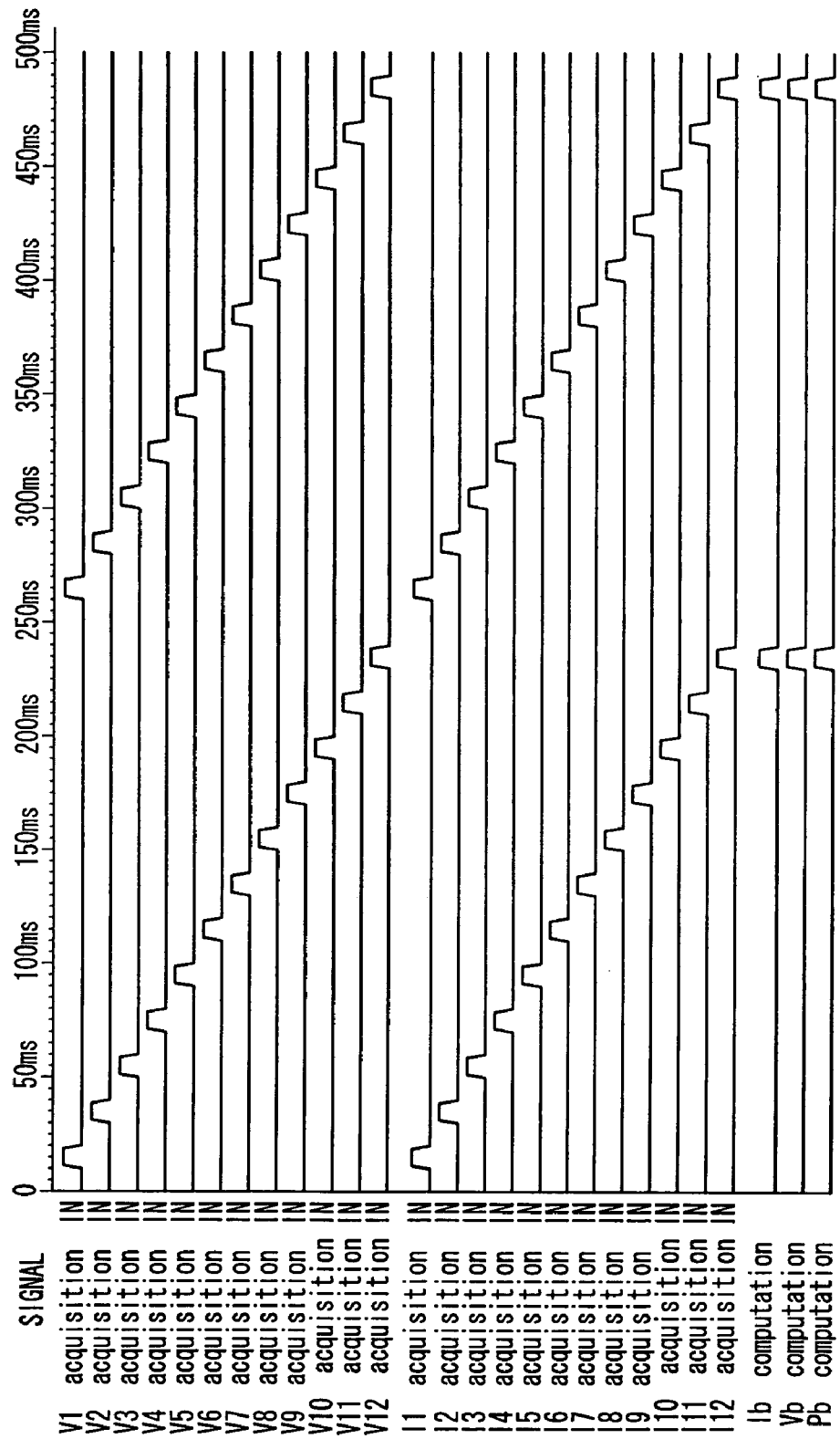
FIG. 7 is a timing chart obtained as a result of calculating effective load power for the entire battery pack in a conventional battery ECU.

FIG. 7 is a timing chart obtained as a result of calculating the effective load power for the entire battery pack in a conventional battery ECU. As shown in FIG. 7, in the past, to compare the effective load power of the entire battery pack and the permissible electric power values, the battery ECU obtained the battery pack voltage Vb by adding up the voltages Vn of 12 blocks. In addition, the battery ECU added up twelve battery pack electric current values In and obtained the electric current of the battery pack Ib by dividing the sum by 12. Thus, the conventional battery ECU required not less than 240 ms to calculate the total electric power Pb by computing the product of Vb and Ib.

In addition, counter-based coincidence processing commonly is used by software for decision-making. Thus, assuming that a contactor opening request signal Copen is outputted after a threefold coincidence, the time required in the example of FIG. 7 is between 740 ms and 980 ms. Consequently, the problem is that detection of pulsed over- (or under)-power, which occurs predominantly in HEVs, has been impossible and, as a result, the battery has not been protected.

Figure 6:
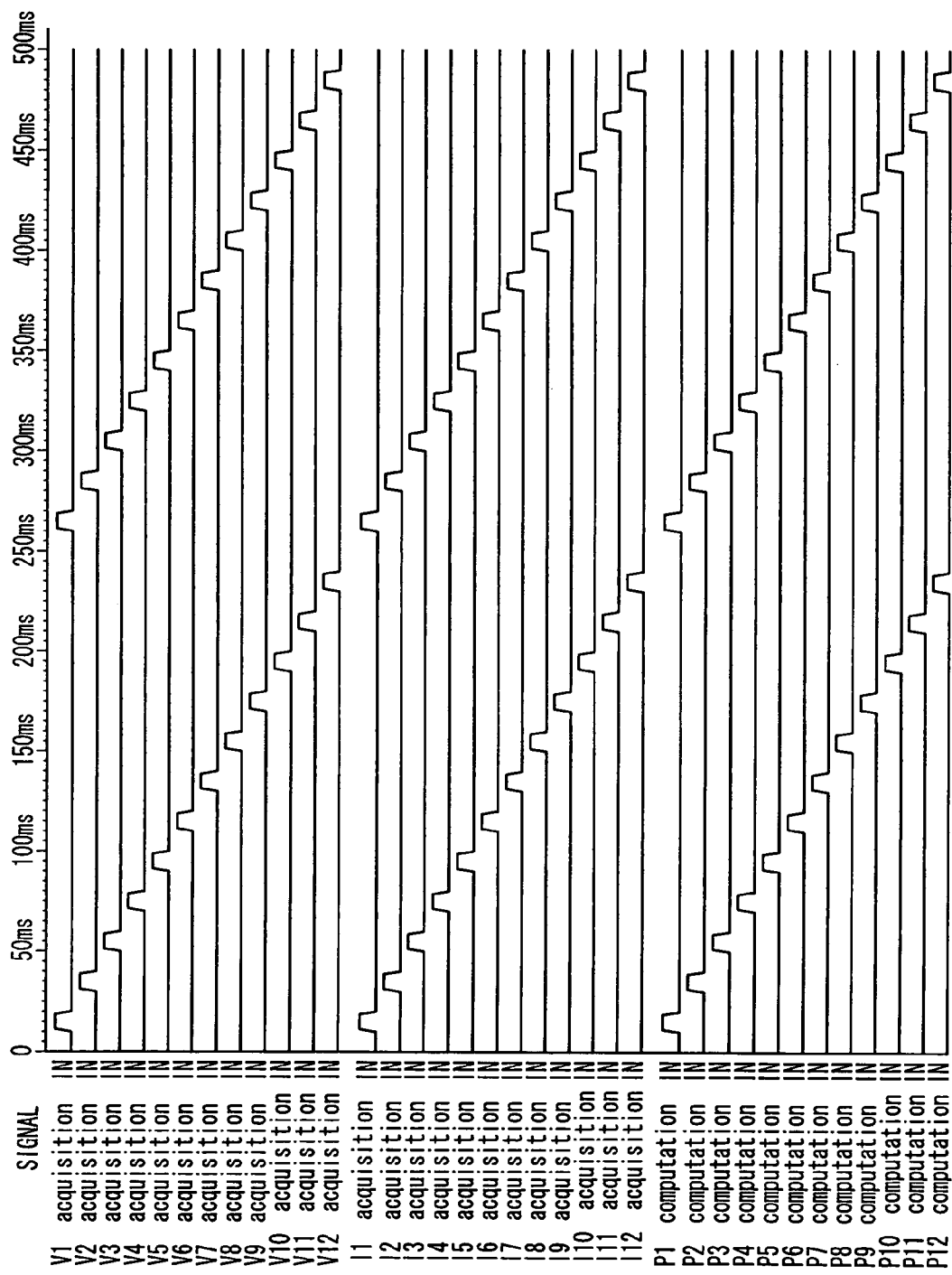
FIG. 6 is a timing chart obtained as a result of block-by-block effective load power calculations in the battery ECU of the present embodiment.

In contrast, in the present invention, as shown in FIG. 6, the time required to get a single piece of data is just 10 ms because the comparison is between a permissible electric power value and the effective load power of each block constituting the battery pack 7. In addition, although counter-based coincidence processing is commonly used by software to make decisions, if we assume that a contactor opening request signal Copen is outputted after a threefold coincidence, a decision can be made within a short time frame of 30 ms to 40 ms. Therefore, the present embodiment permits dependable detection of pulsed over- (under) power and reliable battery protection.

In addition, in the present embodiment, the permissible electric power computation part 205 is configured to calculate the permissible electric power values, but the same effects are obtained, however, if it is configured to calculate permissible electric current values. A simple method for the conversion of the permissible electric power values to permissible electric current values is to divide the permissible electric power values by the voltage of each block. In addition, the same effects are obtained in terms of battery protection even if permissible voltage values are used.

In applications such as HEVs, where the load current and voltage are subject to dramatic changes, it is particularly important to compute and use, as paired data, the voltage for each block and the electric current measured using the same timing as the timing, at which the voltage for each block is measured.

By reliably protecting the secondary batteries, the power supply controller of the present invention can prevent their degradation and reduction in useful life and can maximize the performance of the secondary batteries. In addition, it has the advantage that installing such a power supply controller on an electric vehicle makes it possible to ensure the safety of the electric vehicle. The power supply controller of the present invention can be used in pure electric vehicles (PEV), hybrid electric vehicles (HEV), hybrid electric vehicles including fuel cells and secondary batteries, etc.

With the embodiments explained above intended merely to clarify the technical content of the present invention, the present invention is not limited to such specific examples alone and permits various modifications to be implemented within the scope described in the claims and the spirit of the invention and should be interpreted broadly.

What is claimed is:

1. A power supply controller used for controlling the status of connection between a battery pack formed by combining a plurality of single cells or unit cells that are secondary batteries, and a load attached to the battery pack, the power supply controller comprising:

contact switching devices provided between the battery pack and the load;

a voltage measurement part for measuring voltage block-by-block on a time series basis, with each block containing a predetermined number of single cells or unit cells from the battery pack;

a current measuring circuit for measuring electric current flowing in the battery pack with the same timing as the timing used by the voltage measurement part to measure the voltage of each block;

an electric power computation part for receiving a voltage for each block from the voltage measurement part and an electric current from the current measuring circuit and calculating an electric power for each block;

a counter for counting the number of times the electric power of each block calculated by the electric power computation part exceeds a permissible electric power value; and a control circuit controlling the contact switching devices to an open state at the point when a count value of the counter is equal to or higher than a preset value.

2. The power supply controller according to claim 1, wherein the voltage measurement part comprises a first switch circuit, a second switch circuit, a capacitor, a third switch circuit, and a voltage measuring circuit, the first switch circuit comprises a group of first switch elements, one end of which is connected to one end of every other block constituting the battery pack and the other ends are jointly connected to a first potential detection line;

the second switch circuit has a group of second switch elements, one end of which is connected to the other end of every other block constituting the battery pack and the other ends are jointly connected to a second potential detection line, and, after putting a second switch element forming part of the group of second switch elements into an ON state with the same timing as a first switch element forming part of the group of first switch elements enters into an ON state and putting said second switch element into an OFF state with the same timing as said first switch element enters into an OFF state, brings said second switch element into an ON state again with the same timing as the timing with which a next first switch element forming part of the group of first switch elements enters into an ON state;

the capacitor is provided between the first potential detection line and the second potential detection line;

the third switch circuit goes from an OFF state to an ON state and outputs a potential at both ends of the capacitor after the first switch circuit and the second switch circuit go from an ON state to an OFF state; and the voltage measuring circuit measures voltage for each block based on the potential outputted from the third switch circuit.

3. The power supply controller according to claim 1, which is further comprises a temperature measuring circuit, a state-of-charge computation part, and a permissible electric power computation part, wherein the temperature measuring circuit measures temperature in the vicinity of the blocks subject to the block-by-block voltage measurement by the voltage measurement part, the state-of-charge computation part calculates a state of charge of the battery pack, and the permissible electric power computation part calculates a permissible electric power value for each block based on a temperature/voltage-dependent permissible electric power value, which depends on the temperature measured by the temperature measuring circuit and on the voltage measured by the voltage measurement part, a state-of-charge dependent permissible electric power value, which depends on the state-of-charge calculated by the state-of-charge computation part, and a temperature/state-of-charge dependent permissible electric power value, which depends on the temperature measured by the temperature measuring circuit and on the state-of-charge calculated by the state-of-charge computation part.

4. The power supply controller according to claim 3, wherein the permissible electric power computation part calculates the smallest value among the temperature/voltage-dependent permissible electric power value, the state-of-charge dependent permissible electric power value, and the temperature/state-of-charge dependent permissible electric power value as the permissible electric power value for each block.

5. An electric vehicle that moves by converting DC power from a battery pack formed by combining a plurality of single cells or unit cells that are secondary batteries to AC power using an inverter and supplying it to a motor, wherein the electric vehicle comprises:

at least two contact switching devices provided between the battery pack and the inverter;

a voltage measurement part for measuring voltage block-by-block on a time series basis, with each block containing a predetermined number of single cells or unit cells from the battery pack;

a current measuring circuit for measuring electric current flowing in the battery pack with the same timing as the one used by the voltage measurement part to measure the voltage of each block;

an electric power computation part for receiving a voltage for each block from the voltage measurement part and an electric current from the current measuring circuit and calculating an electric power for each block;

a counter for counting the number of times the electric power of each block calculated by the electric power computation part exceeds a permissible electric power value; and a control circuit controlling the contact switching devices to be in an open state at the point when the count value of the counter is equal to or higher than a preset value.

6. The electric vehicle according to claim 5, wherein the voltage measurement part comprises a first switch circuit, a second switch circuit, a capacitor, a third switch circuit, and a voltage measuring circuit, the first switch circuit comprises a group of first switch elements, one end of which is connected to one end of every other block constituting the battery pack and the other ends are jointly connected to a first potential detection line;

the second switch circuit has a group of second switch elements, one end of which is connected to the other end of every other block constituting the battery pack and the other ends are jointly connected to a second potential detection line, and, after putting a second switch element forming part of the group of second switch elements into an ON state with the same timing as a first switch element forming part of the group of first switch elements enters into an ON state and putting said second switch element into an OFF state with the same timing as said first switch element enters into an OFF state, brings said second switch element into an ON state again with the same timing as the timing with which a next first switch element forming part of the group of first switch elements enters into an ON state;

the capacitor is provided between the first potential detection line and the second potential detection line;

the third switch circuit goes from an OFF state to an ON state and outputs a potential at both ends of the capacitor after the first switch circuit and the second switch circuit go from an ON state to an OFF state; and the voltage measuring circuit measures voltage for each block based on the potential outputted from the third switch circuit.

7. The electric vehicle according to claim 5, which further comprises a temperature measuring circuit, a state-of-charge computation part, and a permissible electric power computation part, wherein:

the temperature measuring circuit measures temperature in the vicinity of the blocks subject to the block-by-block voltage measurement by the voltage measurement part, the state-of-charge computation part calculates a state of charge of the battery pack, and the permissible electric power computation part calculates a permissible electric power value for each block based on a temperature/voltage-dependent permissible electric power value, which depends on the temperature measured by the temperature measuring circuit and on the voltage measured by the voltage measurement part, a state-of-charge dependent permissible electric power value, which depends on the state-of-charge calculated by the state-of-charge computation part, and a temperature/state-of-charge dependent permissible electric power value, which depends on the temperature measured by the temperature measuring circuit and on the state-of-charge calculated by the state-of-charge computation part.

8. The electric vehicle according to claim 7, wherein the permissible electric power computation part calculates the smallest value among the temperature/voltage-dependent permissible electric power value, the state-of-charge dependent permissible electric power value, and the temperature/state-of-charge dependent permissible electric power value as the permissible electric power value for each block.

9. A battery control unit controlling the condition of a battery pack formed by combining a plurality of single cells or unit cells that are secondary batteries, the battery control unit comprising:

a voltage measurement part for measuring voltage block-by-block on a time series basis, with each block containing a predetermined number of single cells or unit cells from the battery pack;

a current measuring circuit for measuring electric current flowing in the battery pack with the same timing as the one used by the voltage measurement part to measure the voltage of each block;

an electric power computation part for receiving a voltage for each block from the voltage measurement part and an electric current from the current measuring circuit and calculating an electric power for each block;

a counter for counting the number of times the electric power of each block calculated by the electric power computation part exceeds a permissible electric power value; and a decision part for deciding whether the count value of the counter has reached a preset value and sending the decision results out.

* * * * *